Patented Mar. 27, 1951

2,546,933

UNITED STATES PATENT OFFICE 2,546,933

METHOD OF DISSOLVING THORIUM VALUES

Frank L. Steahly and Raymond W. Stoughton, Oak Ridge, Tenn., and Frederic W. Schuler, Madison, Wis., assignors to the United States of America as represented by the United States Atomic Energy Commission No Drawing. Application May 24, 1946, Serial No. 672,172

10 Claims. (Cl. 23—14.5)

This invention relates to a method of dissolving thorium values. More particularly, this invention relates to a method of dissolving thorium values involving the use of a solvent comprising nitric acid containing a small amount of a fluorine containing compound.

In this specification and in the claims, the term "thorium values" is intended to include thorium metal as well as compounds of thorium.

It is known that the bombardment of thorium values with fast neutrons of energies about 2 million electron volts (2 MEV) results in a fission of the thorium. It is also known that the bombardment of thorium values with neutrons having energies of below 1 million electron volts (1 MEV) results not only in the production of $Pa^{233}$ and ultimately of $U^{233}$ through the prolonged decay of $Pa^{233}$, but further that $U^{233}$ so produced undergoes fission by neutrons of such low energies as below 1 million (1 MEV) and even with thermal neutrons. The production of $U^{233}$ and/or $Pa^{233}$ is thus complicated by the fact that $Pa^{233}$ and/or $U^{233}$ produced by neutron bombardment may be decomposed by fission under the same bombardment.

In these processes, there are many instances when it becomes necessary to dissolve thorium values such as metallic thorium, thorium oxide, thorium carbonate and the like. While it is known that thorium values may be dissolved in strong sulfuric acid or aqua regia, the use of such solvents for thorium values may be excessively corrosive on industrial equipment and the rate of dissolution slow. It is therefore desirable to develop solvents for thorium values which have no significant corrosive effect upon industrial equipment and which rapidly dissolve the thorium values.

It is accordingly an object of this invention to provide a method of dissolving thorium values.

It is a further object of this invention to provide a method of dissolving thorium values involving the use of particular solvents which are less corrosive and more rapid in action than those heretofore known.

Still another object of this invention is the provision of a method of dissolving thorium values which may be conveniently employed in conjunction with methods of preparing $U^{233}$.

Still another object of this invention is the provision of a solvent for thorium values.

Still another object of this invention is the provision of a solvent for thorium values comprising nitric acid containing a small amount of a fluorine containing compound.

These and other objects of this invention will become apparent to those skilled in the art upon becoming familiar with the following description.

We have found that thorium values such as metallic thorium, thorium oxide, thorium carbonate and the like may be relatively easily dissolved in a solvent comprising nitric acid containing a small amount of certain fluorine containing compounds exemplified by hydrogen fluoride (HF), fluosilicic acid ($H_2SiF_6$), ammonium fluosilicate (($NH_4$)$_2SiF_6$) and the like.

In the practice of our invention, the thorium value to be dissolved is immersed in the solvent therefor and heated to a temperature close to or at the boiling point of the solvent. Generally speaking, in the practice of our invention, the temperature to which the solvent is heated is advantageously between 70° C. to 120° C. In this connection, it has been found that rapid dissolution of thorium values may be obtained at higher temperatures and when utilizing smaller amounts of fluorine containing compound in the solvent. Likewise, with lower temperatures and higher concentrations of fluorine containing compounds, rapid dissolution is effected. The particular temperatures and concentrations of fluorine containing compounds to be employed will vary depending, among other things, upon the particular thorium values to be dissolved, the type of equipment in which the dissolution is effected and the like. Generally speaking, temperatures of approximately 100° C. and a solvent which is approximately 0.05 M in fluorine containing compounds has been found to be particularly advantageous in effecting rapid dissolution of thorium values without significant corrosion of equipment.

In an advantageous embodiment of our invention, the thorium value is immersed in nitric acid and the resulting mixture is heated to an elevated temperature such as between 80° C. to 120° C. Upon attaining the elevated temperature, the fluorine containing compound is added and the resulting mixture is maintained at an elevated temperature such as 100° C. until dissolution is complete.

Our invention may be more readily understood by reference to the following specific examples.

Example I 0.52 g. of uranium metal was placed in a stainless steel vessel containing 5 ml. of concentrated nitric acid. The vessel was heated to a temperature of 100° C. and the time for complete dissolution of the metal observed. The metal was completely dissolved in 30 minutes.

Example II 0.35 g. of thorium was immersed in 5 ml. of concentrated nitric acid in a stainless steel vessel. The vessel was heated to a temperature of 100° C. and the rate of dissolution of the metal was observed. It was found that 30% of the metal was dissolved in 90 minutes.

Example III 0.70 g. of thorium metal was immersed in a stainless steel vessel containing 5 ml. of 4 N $HNO_3$. The contents of the vessel were heated to 100° C. and the rate of dissolution of the metal observed. At the end of 90 minutes 3% of the metal was dissolved.

The above specific examples illustrate the difficulties encountered in dissolving thorium metal in nitric acid as compared to those encountered in dissolving uranium metal. The following specific examples in which are set forth illustrations of our invention clearly show the advantages to be gained in the practice of our invention.

Example IV 0.51 g. of thorium metal was immersed in 5 ml. of concentrated $HNO_3$. The resultant mixture was heated to about 97° C. whereupon sufficient HF was added to make the solvent 0.1 N in HF. The vessel was then heated at 100° C. until all of the metal had dissolved and the time required for complete dissolution after addition of the HF noted. At the end of 13 minutes the metal was completely dissolved.

Example V 0.48 g. of thorium metal was added to a stainless steel vessel containing 5 ml. concentrated nitric acid. The contents of the vessel were then heated to 97° C. and thereafter sufficient HF was added to make the solvent 0.1 N in HF. After addition of the HF the contents of the vessel were heated at 100° C. until the metal was completely dissolved, and the time required for dissolution of the metal after addition of the HF was noted. At the end of 17 minutes, the metal was completely dissolved.

Example VI 0.53 g. of thorium metal was added to a stainless steel vessel containing 5 ml. concentrated nitric acid and the resulting mixture heated to 97° C. whereupon sufficient HF was added to the vessel to make the solvent 0.05 N in HF. Upon addition of the HF, the contents of the vessel were heated at 100° C. until all of the metal had dissolved. The time required for complete dissolution after addition of the HF was noted and found to be 21 minutes.

Example VII 0.48 g. of thorium metal was placed in 5 ml. of concentrated nitric acid contained in a stainless steel vessel. The resulting contents of the vessel were heated to 97° C. whereupon sufficient HF to render the solvent 0.01 N in HF was added thereto. Upon addition of the HF, the contents of the vessel were heated at 100° C. until dissolution of the metal was complete. The time required for dissolution after the addition of HF was noted and found to be 65 minutes.

Example VIII 0.46 g. of thorium metal was immersed in 10 ml. of concentrated nitric acid contained in a stainless steel vessel. The contents of the vessel were heated to 97° C. whereupon the solvent was made 0.01 N in HF. After the addition of HF, the contents of the vessel were heated at 100° C. until the thorium metal was completely dissolved. The time required for complete dissolution was noted and found to be 72 minutes.

Example IX 0.37 g. of thorium metal was immersed in 5 ml. of concentrated nitric acid contained in a stainless steel vessel. The contents of the vessel were heated to 97° C. whereupon sufficient $H_2SiF_6$ was added to render the solvent 0.01 N in $H_2SiF_6$. Thereafter the contents of the vessel were heated at 100° C. until all of the metal had dissolved. The time required for complete dissolution was noted and found to be 20 minutes.

Example X 0.525 g. of thorium metal was immersed in 5 ml. of a solvent which was 16 N in $HNO_3$ and 0.05 N in HF. The resulting mixture was heated at 100° C. and the time required for complete dissolution of the metal was noted and found to be 21 minutes.

Example XI 2.15 g. of thorium metal was immersed in 7 ml. of a solvent which was 16 N in $HNO_3$ and 0.05 N in HF. The resulting mixture was heated at 100° C. The time required for complete dissolution of the metal was noted and found to be 90 minutes.

From the above specific examples, it can be seen that nitric acid containing a small amount of fluorine compounds such as HF or $H_2SiF_6$ dissolves thorium metal as rapidly as $HNO_3$ dissolves uranium metal. Generally speaking, rapid dissolution may be effected by the addition of sufficient fluorine containing compound to render the solvent at least 0.002 M in the compound.

The difference in solution time between Example X and Example XI results from the increase in weight of metal and decrease in excess acid in the case of the larger sample in Example XI.

The following specific examples are illustrative of the application of our invention to the dissolution of compounds of thorium as exemplified by thorium oxide ($ThO_2$).

Example XII 0.5 g. of $ThO_2$ was placed in a glass reaction vessel together with 10 ml. 8 N $HNO_3$. The contents of the vessel were heated to 97° C. whereupon sufficient HF was added to render the solvent 0.011 N in HF. The mixture was then heated at 100° C. until all of the oxide had dissolved. The time between the addition of HF and the complete dissolution of the oxide was recorded and found to be 11 minutes.

Example XIII 0.5 g. of $ThO_2$ and 10 ml. 8 N $HNO_3$ were placed in a glass reaction vessel and heated to 97° C. whereupon sufficient HF was added to render the solvent 0.0082 N in HF. Thereafter the reaction mixture was heated at 100° C. until all of the oxide had dissolved. The time between the addition of HF and complete dissolution of the oxide was noted and found to be 13 minutes.

Example XIV 0.5 g. $ThO_2$ and 10 ml. 8 N $HNO_3$ were placed in a glass reaction vessel and heated to 97° C. whereupon sufficient HF to render the solvent 0.0055 N in HF was added. The resulting mixture was then heated at 100° C. until all of the oxide had dissolved. The time between the addition of HF and the complete dissolution of the oxide was recorded and found to be 15 minutes.

Example XV 0.5 g. $ThO_2$ and 10 ml. $HNO_3$ were placed in a glass reaction vessel and heated to 97° C., whereupon sufficient HF was added to the vessel to render the solvent 0.011 N in HF. Thereafter the reaction mixture was heated at 100° C. until all of the oxide had dissolved. The time between the addition of HF and complete dissolution of the oxide was recorded and found to be 3.5 minutes.

Example XVI 0.5 g. $ThO_2$ and 10 ml. 16 N $HNO_3$ were placed in a glass reaction vessel and heated to 97° C., whereupon the solvent was made 0.0055 N in HF. Thereafter the reaction mixture was heated at 100° C. until all of the oxide had dissolved. The time between the addition of HF and complete dissolution of the oxide was noted and found to be 3.5 minutes.

Example XVII 0.5 g. $ThO_2$ and 10 ml. 16 N $HNO_3$ were placed in a glass reaction vessel and heated to 97° C. whereupon the solvent was made 0.0027 N in HF. Thereafter the reaction mixture was heated at 100° C. until all of the oxide had dissolved. The time between the addition of HF and the complete dissolution of the oxide was noted and found to be 5 minutes.

Example XVIII 0.5 g. $ThO_2$ and 10 ml. of 16 N $HNO_3$ were placed in a glass reaction vessel and heated to 80° C. whereupon sufficient $(NH_4)_2SiF_6$ was added to render the solvent 0.010 M. in $(NH_4)_2SiF_6$. Thereafter the reaction mixture was heated at 100° C. until all of the oxide had dissolved. The time between the addition of $(NH_4)_2SiF_6$ and complete dissolution of the oxide was recorded and found to be 9 minutes.

Example XIX 0.5 g. $ThO_2$ and 10 ml. of 8 N $HNO_3$ were placed in a glass reaction vessel and heated to 80° C. whereupon sufficient $(NH_4)_2SiF_6$ was added to the vessel to render the solvent 0.010 M. in $(NH_4)_2SiF_6$. The time between the addition of $(NH_4)_2SiF_6$ and the complete dissolution of the oxide was recorded and found to be 6 minutes.

Example XX 0.5 g. $ThO_2$ and 10 ml. 16 N $HNO_3$ were placed in a glass reaction vessel and heated to 80° C. whereupon sufficient $(NH_4)_2SiF_6$ was added to the vessel to render the solvent 0.015 M in $(NH_4)_2SiF_6$. Thereafter the mixture was heated at 100° C. until all of the oxide had dissolved. The time between the addition of $(NH_4)_2SiF_6$ and the complete dissolution of the oxide was recorded and found to be 9 minutes.

Example XXI 0.5 g. $ThO_2$ and 10 ml. 8 N $HNO_3$ were placed in a glass reaction vessel and heated to 80° C. whereupon sufficient $(NH_4)_2SiF_6$ was added to the mixture to render the solvent 0.0027 M in $(NH_4)_2SiF_6$. Thereafter the mixture was heated at 100° C. until all of the oxide had dissolved. The time between the addition of $(NH_4)_2SiF_6$ and the complete dissolution of the oxide was recorded and found to be 9.5 minutes.

The following three specific examples further illustrate the improvements to be obtained in the practice of our invention in dissolving thorium values over the use of nitric acid without the addition of a fluorine containing compound.

Example XXII

A 10 g. sample of $ThO_2$ was heated in 28 ml. 16 N $HNO_3$ (3 times the stoichiometric amount of $HNO_3$ required to convert $ThO_2$ to the nitrate) contained in a glass vessel for 50 hours at 100° C. At the end of this time only 1.1% of the $ThO_2$ had dissolved.

Example XXIII

A 10 g. sample of the $ThO_2$ employed in Example XXII was placed in a stainless steel beaker together with 28 ml. 16 N $HNO_3$ (3 times the stoichiometric amount of $HNO_3$ required to convert $ThO_2$ to the nitrate). Sufficient HF was added to render the solvent 0.05 N in HF and the mixture was heated at 105-110° C. until all of the $ThO_2$ was dissolved. The time required to effect complete dissolution was found to be 20 minutes.

Example XXIV

A 10 g. sample of the $ThO_2$ employed in Example XXII was placed in a glass vessel together with 28 ml. of 16 N $HNO_3$. Sufficient HF was added to render the solvent 0.05 N in HF and the resulting mixture heated at 100° C. until dissolution of the oxide was complete. The time required for complete dissolution was measured and found to be 50 minutes.

The higher temperature is believed to be chiefly responsible for the shorter solution time resulting from employing the conditions of Example XXIII, although the presence of glass in the conditions of Example XXIV may have tended to increase the solution time.

Example XXV 64 g. pellet of compressed $ThO_2$ was placed in a reaction vessel together with 363 ml. of a solvent which was 8 N in $HNO_3$ and 0.005 M in $(NH_4)_2SiF_6$. The mixture was heated for 2 hours at 100° C. Most of the oxide seemed to dissolve in about 10 minutes, while a relatively small amount of it required the total 2 hours before its complete solution.

In the practice of our invention, generally speaking, the amount of nitric acid and the amount of fluorine containing compound will depend upon the size of the sample to be dissolved, the temperatures employed, and the like. However, particularly advantageous results may be generally obtained by utilizing as a solvent a material which is between 8 and 16 N in nitric acid and which is between 0.002 M and 0.5 M in fluorine containing compound. As indicated above, with lower concentrations of fluorine containing compound, generally speaking, higher temperatures are required for dissolution in a reasonable length of time. However, when higher temperatures such as temperatures above 100° C. are employed, corrosion of equipment may result. It is particularly advantageous therefore to operate at temperatures of between 70° C. and 100° C. and when utilizing solvents which are less than 0.2 M in fluorine containing compound, such as 0.05 M, and 10 to 13 M in $HNO_3$.

While our invention has been particularly described with reference to certain particular embodiments and with reference to certain specific examples, it is to be understood that the invention is not to be limited thereby. Therefore, changes, omissions, and/or additions may be made without departing from the spirit of the invention as defined in the appended claims which are intended to be limited only as required by the prior art.

We claim:

1. A method of dissolving thorium values which comprises heating said thorium values in a solvent containing nitric acid and a small amount of a fluorine containing compound.

2. A method of dissolving thorium values which comprises heating said thorium values in a material containing nitric acid, said material being up to 0.5 M in a fluorine containing compound.

3. A method of dissolving thorium values which comprises heating said thorium values in the presence of nitric acid containing a small amount of hydrogen fluoride.

4. A method of dissolving thorium values which comprises heating said thorium values in the presence of nitric acid containing a small amount of fluosilicic acid.

5. A method of dissolving thorium values which comprises heating said thorium values in the presence of nitric acid containing a small amount of ammonium fluosilicate.

6. A method of dissolving metallic thorium which comprises heating said metallic thorium in the presence of a solvent containing nitric acid and a small amount of a fluorine containing compound.

7. A method of dissolving thorium oxide which comprises heating said oxide in the presence of a solvent containing a small amount of a fluorine containing compound.

8. A method of dissolving thorium carbonate which comprises heating said thorium carbonate in the presence of a solvent containing nitric acid and a small amount of a fluorine containing compound.

9. In a process which includes the step of dissolving thorium values, the improvement which comprises contacting said thorium values with a solvent containing nitric acid and a small amount of a compound selected of a group consisting of hydrogen fluoride, fluosilicic acid and ammonium fluosilicate and heating the resulting mixture.

10. A method of dissolving thorium values which comprises immersing said thorium values in a solution which is between 8 and 16 N in nitric acid, rendering said solution between 0.002 and 0.5 N in a fluorine containing compound and heating the resulting mixture to a temperature of between 70° C. and 120° C.

FRANK L. STEAHLY.
RAYMOND W. STOUGHTON.
FREDERIC W. SCHULER.

No references cited.